United States Patent Office 3,431,250
Patented Mar. 4, 1969

3,431,250
PROCESS FOR THE PURIFICATION OF LOW-MOLECULAR POLYETHYLENE MASH
Manfred Rätzsch and Horst Grundmann, Leuna, Rolf Kilian, Bad Durrenberg, and Helmut Reinhardt, Weissenfels, Germany, assignors to VEB Leuna-Werke, Walter Ulbricht, Leuna, Germany
No Drawing. Filed Dec. 6, 1965, Ser. No. 512,006
U.S. Cl. 260—94.9  3 Claims
Int. Cl. C08f 1/88, 3/04

ABSTRACT OF THE DISCLOSURE

Method for purifying low molecular weight polyethylene mashes consisting of about 30 to 50% by weight of crystalline wax and about 50 to 70% by weight of non-crystalline and oily components, said mashes accumulating during the high pressure polymerization of ethylene, which comprises the steps of heating the mashes to a temperature ranging from 100° to 300° C. in a closed pressureless vessel which contains a protective gas atmosphere, and subsequently separating the resulting mass into a bottom portion containing the impurities and a top portion containing the pure polyethylene mash.

The invention relates to a process for purification of low-molecular polyethylene mash, which is a byproduct of high pressure polymerization of ethylene.

Polyethylene mashes are of semi-solid consistency and consist of about 30 to 50% by weight of crystalline wax, and 50 to 70% by weight of non-crystalline and oily components with a molecular weight below 10,000 as well as entrained high pressure compressor lubricant and mechanical impurities.

In a non-purified state, the polyethylene mashes constitute a waste product, but in a pure state, they are a desirable additive in the paraffin processing industry, for coating and impregnating of paper, for making wax flowers, floor wax, lacquer maintenance, and adhesives, as well as for increasing the flexibility of Fischer-Tropsch-Paraffin.

The polyethylene mash is obtained when the high pressure polymerization of ethylene, thermo-plastic polyethylene is received together with non-converted ethylene, in a separator where pressure relief to about 200 to 300 atmospheres takes place. From this separator, the non-converted ethylene together with most of the polyethylene mash passes through a high pressure circulating system, in which the polyethylene mash is separated.

It is known to pass the polyethylene mash from the high pressure circulating system of polyethylene plants into unheated open or closed containers, or into pits where pressure reduction takes place and an inhomogeneous semi-solid product is obtained, which is generally discarded because of its impurity, or burned in power plants.

It is true that various methods for purifying the polyethylene mash are known. One of these methods consists of melting the polyethylene mash with subsequent hot filtration and with addition of bleaching earth and other filtration aids. This method is rather unsatisfactory, since the filtration process must be performed under exclusion of air in order to avoid discoloring of the hot polyethylene mash, due to oxidation. Frequent cleaning of the filter press is necessary in view of the impure state of the polyethylene mash. This cleaning operation is hard to perform due to the stickiness of the product.

A further purifying process is based upon an extraction treatment of the polyethylene mash with a selective solvent. However, this treatment is disadvantageous due to the large amount of solvent needed, since a considerable amount of equipment would be required for carrying out the extraction and for the recovery of the solvent.

It is an object of the invention to develop a method for purifying low-molecular polyethylene mash, wherein the above noted shortcomings are eliminated.

This object is achieved according to the invention, by collecting the low-molecular polyethylene mash obtained in the high pressure polymerization in a closed pressureless vessel, where it settles down; the container contains a protective gas atmosphere, and heating takes place therein to a temperature between 100° and 300° C. Each charge is subsequently removed and separated into a part containing the pure mash, and another part containing the impurities.

In accordance with the inventive method, a separation into two liquid phases occurs in the polyethylene mash, because of the presence of a high-pressure compressor lubricant which is immiscible with polyethylene. The lower phase contains predominantly the compressor lubricant, as well as all mechanical impurities, while the upper phase consists of a colorless polyethylene mash. When a high pressure lubricant is used which mixes with polyethylene, the impurities concentrate in the bottom portion of the lubricant-containing liquid polyethylene mash, without formation of distinct phases; however, in any case, an accurate separation of the impurities, and purified portions can be performed by slowly draining the liquid through a bottom valve. Since the polyethylene mash is in the form of a thin liquid melt, a fast and clean draining from the vessel into cans is made possible.

According to the invention, the polyethylene mash is obtained in a colorless state without additional refining processes, so that this method is superior over the known methods due to its economy, while obtaining the same degree of purity.

Due to the presence in the settling vessel, of a protective gas atmosphere, which may consist of pure nitrogen, argon, ethylene or carbon dioxide, an oxidation of the polyethylene mash is positively prevented. When high pressure compressor lubricant is used in the vessel which is immiscible with polyethylene, the high pressure compressor lubricant of the lower phase can be reclaimed by distillation.

It is particularly advantageous to connect a properly dimensioned settling vessel directly to the high pressure circulating system of a polyethylene plant and to periodically reduce the pressure of the accumulated polyethylene mash in the vessel, whereby the required protective gas atmosphere is provided by the effluent ethylene. By connecting a gasometer behind the settling vessel, the ethylene which is escaping from the hot polyethylene mash can be recovered and can be reused for polymerization.

In the following the invention will be more fully described in a number of examples, but it should be understood that these are given by way of illustration and not of limitation and that many changes in the details can be made without departing from the spirit of the invention.

EXAMPLE 1

11 parts by weight of a gray-brown polyethylene mash, containing after the polymerization process polyran oil as the lubricant of the high pressure compressor, which is immiscible with polyethylene will be introduced into a stationary metal container.

Thereafter, the remaining air in the container will be displaced by nitrogen. The container is protected against a renewed entrance of air by submerging it in mercury. After six hours of heating of the polyethylene mash to 130° C., two phases have formed. The lower phase consists of 0.6 part by weight of a dirty gray liquid which is composed of mechanical impurities and a compressor lubricant which is immiscible with polyethylene and which is drained through a bottom valve. 10.4 parts by weight of a colorless melt of the pure polyethylene mash are obtained as the upper phase, which has a mean molecular weight of 4,000 and melts in a range of 60° C. to 150° C. The mash contains 35% by weight of a crystalline wax with a softening point of 90° C. and 65% by weight of non-crystalline and oily components.

EXAMPLE 2

Impure polyethylene mash which accumulates in the circulating gas system during the high pressure polymerization of ethylene in the presence of traces of oxygen and with application of glycerol, which is immiscible with polyethylene, is passed through a valve heated to 200° C. into a settling vessel, which is filled with ethylene connected to a gasometer. After four hours, a separation of the polyethylene mash has taken place, that is to say, a separation into a heavy phase, primarily consisting of glycerol and mechanical impurities, and a lighter phase, consisting of pure, low-molecular polyethylene mash.

The phase containing the lubricant (one part by weight) will be drained through the bottom valve of the vessel as a dirty-gray liquid. Subsequently, the phase containing the polyethylene mash (10 parts by weight) as a colorless melt, will be drained into cans, wherein it solidifies to a semi-solid mass within about 12 hours. The purified polyethylene mash has a mean molecular weight of 4,000 and melts in a range of 60° C. to 105° C. The mash contains 35% by weight of a crystalline wax with a softening point of 90° C. and 65% by weight of a non-crystalline and oily component.

EXAMPLE 3

During the polymerization under conditions described in Example 2, with paraffin oil as a high pressure compressor lubricant being miscible with polyethylene, a melt will be obtained in the vessel in which the impurities concentrate at the bottom thereof within 5 hours. At first, 0.4 part by weight of an impure polyethylene mash are drained through the bottom valve. The remainder consists of 10 parts by weight of a pure polyethylene mash with a mean molecular weight of 4,000 which melts in a range of 60° C. to 105° C. The mash contains 35% by weight of a crystalline wax with a softening point of 90° C. and 65% by weight of non-crystatlline and oily components.

What is claimed is:

1. A method for purifying low-molecular polyethylene mashes accumulating during the high pressure polymerization of ethylene and consisting of about 30 to 50% by weight of crystalline wax and about 50 to 70% by weight of non-crystalline and oily components, comprising the steps of heating the polyethylene mash to a temperature ranging from 100° C. to 300° C. in a closed pressureless vessel which contains a protective gas atmosphere, and subsequently separating the resulting mass into a bottom portion containing the impurities and a top portion containing the pure polyethylene mash.

2. The method according to claim 1, wherein the separation into pure and impure portions is effected by draining the bottom portion containing the impurities in batches.

3. The method according to claim 1, which comprises the steps of periodically reducing the pressure on the polyethylene mash from the high pressure circulating gas system of a polyethylene apparatus by passing the mash directly into a properly dimensioned settling vessel thereby causing the escape of unreacted ethylene which forms the required protective gas atmosphere.

No references cited.

JOSEPH L. SCHOFER, *Primary Examiner.*

L. EDELMAN, *Assistant Examiner.*